Patented Sept. 24, 1946

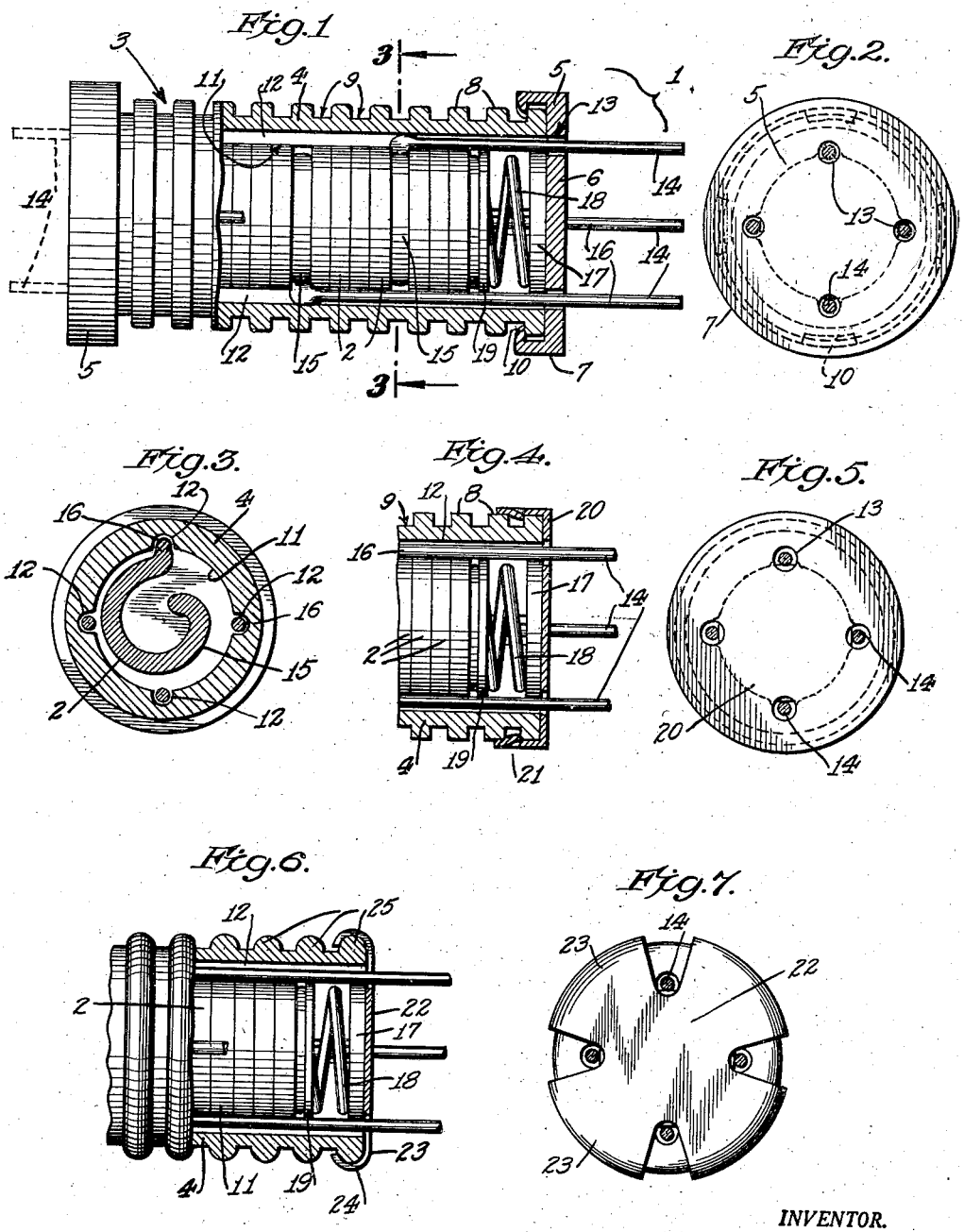

2,408,052

UNITED STATES PATENT OFFICE 2,408,052

RECTIFIER STACK MOUNTING CONSTRUCTION

Max Enderlin, Madison, N. J., assignor to Federal Telephone and Radio Corporation, New York, N. Y., a corporation of Delaware Application May 22, 1944, Serial No. 536,690

4 Claims. (Cl. 175—366)

This invention relates to metal contact rectifier stacks and is directed to an improved stack mounting construction in the form of a tubular casing especially adapted for use with small rectifier disks.

Metal contact rectifiers, also known as dry rectifiers, are manufactured in the form of plates or disks provided with metal electrodes on opposite faces and a semi-conducting layer between the electrodes, one particularly desirable form utilizing selenium as the principal constituent of the semi-conducting layer. These rectifier disks in the larger sizes usually are provided with mounting apertures which permit them to be assembled in stack form on a mounting bolt or stud. However, this is not desirable with the smaller sizes, which may best be mounted in a tubular casing when it is desirable to arrange a plurality of disks in a single stack.

The provision of a suitable mounting of this type presents various problems. The length of the stack varies widely, and the disks in the stack may be connected in a great many different ways, including series, series-parallel and bridge arrangements with varying numbers of disks in different series units, all in the same stack. For this purpose contact elements are placed between the disks in the stack and are connected to leads extending out through the mounting; and portions of the stack may be electrically separated by interposing insulating disks at suitable points.

A general purpose of the invention is to provide a novel stack mounting and arrangement particularly effective for stacks of this type. Specific objects are to provide a mounting that is compact, strong, easily made and readily assembled. Further purposes are to provide an arrangement in which the stack elements, including the disks, contacts, leads and separators may be readily and rapidly inserted in any desired type of connection, and which may be readily closed and opened. These objects are of particular importance because stack assembly is a manual operation and the labor involved therein is a substantial item in the cost of the stack.

Another purpose is to provide an electrically efficient construction in which the stack elements are held firmly in place under pressure so as to assure good contact connections, and the leads are well separated to avoid short-circuits and facilitate connection to outside circuits.

An additional purpose is the provision of a stack mounting which is suitable without alteration to different electrical and mechanical arrangements of the stack elements, so that the same mounting may be interchangeably used in different types of rectifier circuits.

An additional feature is the provision of a stack casing construction which is adaptable for use with stacks of widely varying lengths, eliminating the necessity for keeping in stock a large number of sizes. This is in general accomplished by providing a casing construction which is adapted to be made in the form of a long tube from which a casing body which will house a stack of any desired length may be cut, the tube being formed so that each body cut therefrom will be provided adjacent its ends with cap-retaining elements. A related feature is the provision of a novel cap structure which may be placed on an end of the body, and of cooperating engaging elements on the cap and body end which permit the cap to be rapidly fixed in place and firmly held during use.

Other objects and advantages will appear from the following description considered in connection with the accompanying drawing, in which Fig. 1 is a side view, partly in elevation and partly in central longitudinal section, of a stack mounting construction embodying the invention;

Fig. 2 is an end view thereof, with the cap construction indicated in dotted lines;

Fig. 3 is a transverse section on line 3—3 of Fig. 1;

Fig. 4 is a fragmentary end view in central longitudinal section of a similar construction showing a modified form of cap;

Fig. 5 is an end view of the embodiment shown in Fig. 4;

Fig. 6 is a fragmentary view similar to Fig. 1 showing another modified form of cap and body construction; and Fig. 7 is an end view of the embodiment shown in Fig. 6.

The rectifying stack 1 includes a plurality of rectifier disks 2, which may be of the selenium type, mounted in flat superposed position in a casing 3 comprising a tubular body 4 fitting the disks 2 and end caps 5 which retain the disks within body 4. The caps 5 may be identical, and include a relatively flat central closure portion 6 extending substantially across the end of body 4, and a depending skirt 7 extending around the outside of the body and provided with suitable elements engaging corresponding elements on the body 4 for holding the cap 5 in place. The body 4 is provided with a longitudinal series of such elements arranged so that one element will be adjacent the end of the body 4 in position for engagement by skirt 7.

These engaging elements advantageously are in the form of annular ridges 8 with intervening annular grooves 9, which in the form illustrated extend completely around the body 4. One of the ridges 8 is located at the end of the body 4, and skirt 7 is provided with inward locking projection 10 adapted to extend into the adjacent groove 9 so as to hold the cap 5 in place. In the embodiment illustrated in Figs. 1–3 the cap 5 is adapted for production from solid insulating material, such as a suitable synthetic resin; and it has been found that by suitably designing the skirt 7 and a plurality of circumferentially spaced locking projections 10 the latter may be forced over the end ridge 8 and will snap into the succeeding groove 9, especially when the nose on projection 10 is rounded, the resilience and compressibility of the cap being sufficient to permit the operation of this type of snap closure. The corners of the ridges 8 may be slightly rounded to facilitate this operation.

The cylindrical chamber 11 in the tubular body 4 is advantageously proportioned so as to have an easy sliding fit with the rectifier disks 2 of predetermined size, and is provided with a plurality of longitudinal channels 12 in its side wall in which leads may be located, extending through aligned openings 13 in the cap 5. In the form illustrated simple but efficient connectors or pigtails 14 are utilized, each having a flattened spiral end 15 fitting between disks 2 and an integral connection wire 16 at right angles to the spiral 15 extending into and along a channel 12 and through cap 5.

In order to maintain the proper pressure on the stack, resilient biasing means is advantageously provided between the stack end 1 and cap 5. This may comprise a disk 17, which is preferably of insulating material and may be sufficiently yieldable and resilient to exert the desired pressure when the stack is of a proper length to bear against both ends 5 of the casing 3 with disk 17 in place. However, it is usually desirable to employ a spiral spring 18 bearing against the cap 5 and the end of the stack. Where the cap is made of insulating material the disk 17 may be dispensed with; and where a spiral contact 15 is located against the end of the stack it is generally desirable to employ a pressure disk 19 between the spring and the spiral.

With this arrangement the stack may be readily and rapidly assembled in any desired electrical arrangement. For this purpose a cap 5 is snapped in place on one end of the body 4, the rectifier disks 2 and pigtails 14 are inserted successively in the chamber 1, spring 18 (with disks 17 and 19 where used) is placed on top of the stack, the connection wires 16 are passed through openings 13 in the other cap 5, and the latter cap is snapped into place, compressing the spring 18 and holding the stack firmly in position.

The casing construction is arranged so that all of the lead wires 16 may project from one end of the casing 3, or any selected lead wires may be inserted in the opposite direction and project from the other end, as indicated in dotted lines in Fig. 1. The direction of forward current flow for each disk or group of disks can be suitably arranged by properly facing the disks in the chamber 11 with reference to adjacent disks and contact spirals 15. Adjacent disks may be electrically separated by inserting an insulating disk 17 between them. The connection wire 16 should be coated with insulation or otherwise insulated to avoid short-circuits.

It will be noted that in the form illustrated the body 4 may be originally made in the form of a tube of any desired length. By cutting the tube into suitable lengths each having a ridge 8 at each end, bodies 4 which will accommodate substantially any predetermined length of stack may be formed, the difference in length between bodies of successive sizes being determined by the spacing between grooves 9, which can be made relatively narrow. It is advantageous to make the groove width substantially equal to the width of a saw kerf, so that no additional operations will be necessary in finishing the ends of the body cut from a tube. The caps 5 will fit the ends of a body thus formed by cutting from a tube, regardless of the length of the body.

The construction of Figs. 1–3 is particularly suitable for production by standard molding process from insulating plastic materials, and is additionally advantageous when metal is difficult to obtain, because it does not require the use of metal for the casing. The parts can be rapidly and efficiently produced in this manner at very low cost.

The described construction may be modified in various ways. The molded cap 5 may be replaced by a metal cap 20, similar in general construction and arrangement to cap 5 but provided with yieldable struck-up retaining lugs 21. In practice these lugs may be arranged so that the cap 20 (Figs. 4 and 5) may be pried off when necessary, or may be shaped so that they provide a permanent seal preventing tampering with the stack, depending upon the particular contour given the lugs 21 and the contacting portions of the end ridge 8.

In the arrangement illustrated in Figs. 6 and 7, the metal cap 22 is formed with separate sections 23 extending outwardly from the connection wires 16, which project between the sections 23. The outer ends of said sections are curved to form hook-shaped retaining flanges 24 which snap over the end ridge 25. Ridges 25 in this embodiment are arranged and function similarly to ridges 8, but are rounded in cross section, fitting flanges 24 to provide a firm snap type retaining engagement between cap 22 and the casing body 4.

While a preferred embodiment has been described and shown this has been done by way of illustration and not limitation, since numerous variations may be made without departing from the invention. For instance, while the invention is particularly advantageous for use with small rectifier disks, it includes certain features which may be utilized in mounting stacks of larger disks; and it has the advantage that substantially the entire disk area is available for rectification without any reduction by reason of mounting openings and the inactive area usually surrounding such openings. The shape of the chamber 11 may of course be varied to fit disks of any selected contour.

The engaging elements on the cap 5, 20, 22 and the body 4 may be considerably varied, though the illustrated arrangement is especially desirable because of its simplicity of construction, ease of assembly and efficiency of operation. For instance, while continuous annular ridges 8, 25 are disclosed, the invention is not limited in its broader aspects to this type of construction.

What is claimed is:

1. A rectifier stack mounting comprising a tubular body having a chamber fitting a rectifier stack, end closures for the chamber, and cooperating elements on the body and a closure for holding the latter closure in position on the body, including a circumferentially arranged ridge structure on the body, said body being made of readily severable material and having a longitudinal series of ridge structures spaced for transverse severance between adjacent ridge structures.

2. A rectifier stack mounting as set forth in claim 1 in which the ridge structures comprise continuous circumferential ridges.

3. A rectifier stack structure, comprising a tubular body having an inner chamber with at least one internal longitudinal channel, a rectifier stack composed of a series of rectifier disks fitting within said body, closures for the chamber ends, a stack lead extending through one of said closures into said channel and terminating in a contact element located between certain of said disks.

4. A rectifier stack as set forth in claim 3 further defined in that the chamber inner wall has a plurality of channels each to receive a stack lead some of the channels terminating only at one end of the chamber and some terminating only at the opposite end of the chamber while the closures have apertures to register with the ends of their respective channels.

MAX ENDERLIN.